O. W. NUNN.
SANITARY SHOE STOOL.
APPLICATION FILED DEC. 13, 1913.
1,125,155.
Patented Jan. 19, 1915.
2 SHEETS—SHEET 1.
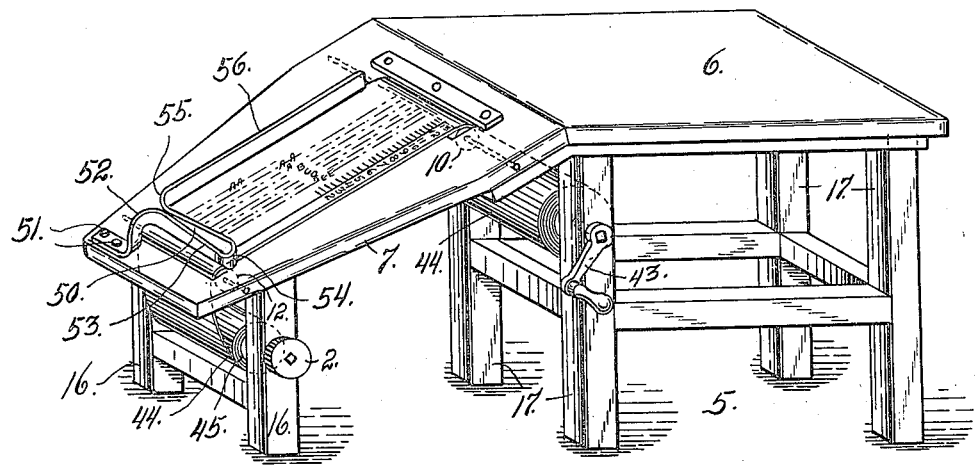
Fig. 1.
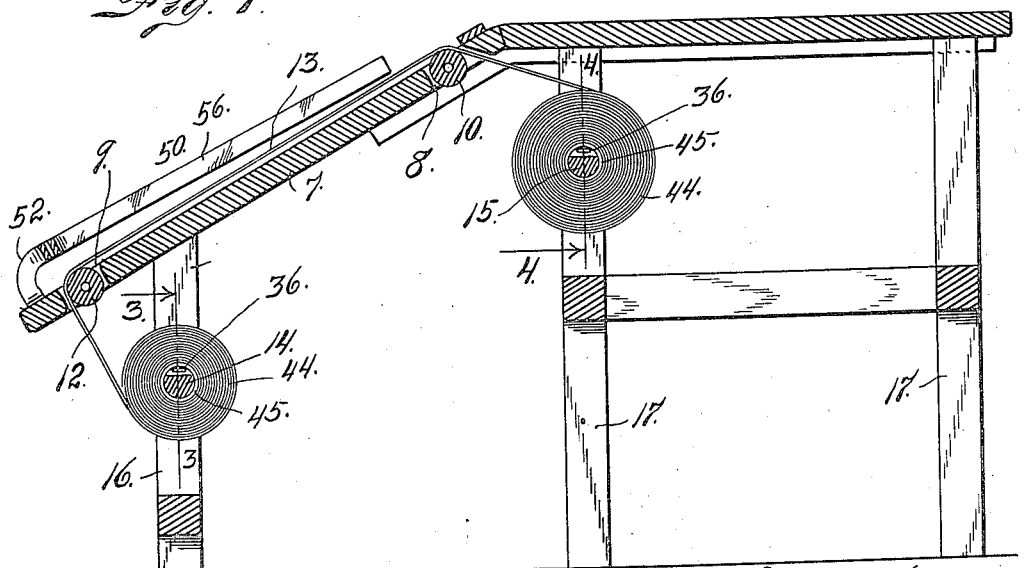
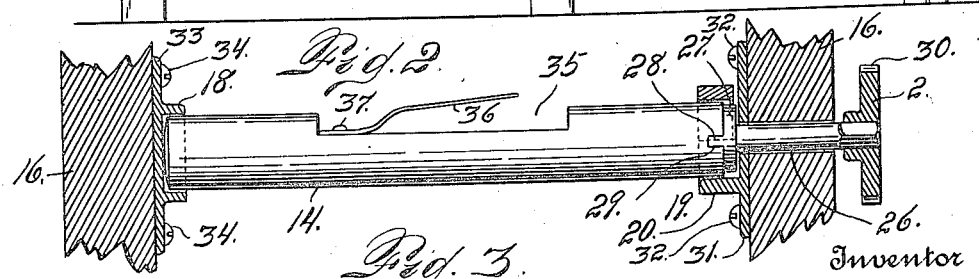
Fig. 2.
Fig. 3.
Witnesses
Otto E. Hoddick.
L. E. Petersen.
Inventor
Orion W. Nunn.
By H. J. O'Brien, Attorney

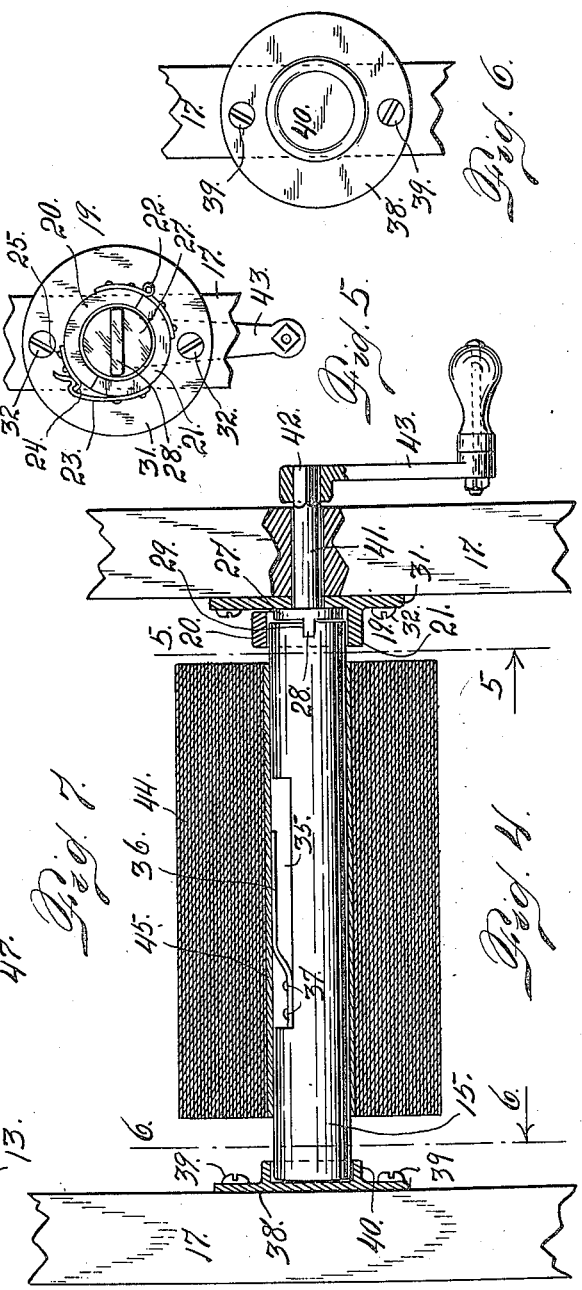

UNITED STATES PATENT OFFICE.

ORION W. NUNN, OF DENVER, COLORADO, ASSIGNOR OF ONE-FOURTH TO CHARLES MAHLER, ONE-FOURTH TO ERNEST W. SCHOLPP, AND ONE-FOURTH TO FRED K. SCHOLPP.

SANITARY SHOE-STOOL.

1,125,155.   Specification of Letters Patent.   Patented Jan. 19, 1915.

Application filed December 13, 1913. Serial No. 806,378.

*To all whom it may concern:*

Be it known that I, ORION W. NUNN, citizen of the United States, residing in the city and county of Denver and State of Colorado, have invented certain new and useful Improvements in Sanitary Shoe-Stools; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in shoe stools, one object being to provide a device of this character which shall be sanitary, and to this end a strip of paper extends lengthwise on the inclined portion of the stool upon which the customer places his feet, either before or after the shoe has been removed. This strip of paper is connected with two rollers, one of which is a supply roller, while the other is an operating roller.

Another object of the invention is to provide a device of this character in which the strip of paper or other material is provided with a multiplicity of measuring charts, each chart being arranged to measure the foot of the customer, whereby the proper size of the shoe may be readily determined, both as to width and length. Provision is also made for placing the name and address of the customer upon the chart used by him; also the stock number, a substitute blank and a date blank. When these are filled out a record should be made in a proper book. Each chart so prepared is wound upon the receiving roller and the roll is removed and placed on file in such a manner that it may be readily referred to from the record book, when the same person wants another pair of shoes, either in person, or by mail.

Having briefly outlined my improved construction, I will proceed to describe the same in detail, reference being made to the accompanying drawing, in which is illustrated an embodiment thereof.

In this drawing: Figure 1 is a perspective view of my improved shoe stool. Fig. 2 is a longitudinal central section of the same. Fig. 3 is a detail view of the supply roller illustrating the manner of mounting the same, shown on a larger scale. Fig. 4 is a similar view of the receiving roller showing the paper wound thereon. Fig. 5 is an end view of the operating spindle viewed from the line 5—5, looking toward the right. Fig. 6 is a similar view of the mounting for one end of the roller looking from the line 6—6 toward the left. Fig. 7 is a detail view of a portion of the strip of paper employed showing one of the measuring charts complete.

The same reference characters indicate the same parts in all the views.

Let the numeral 5 designate the stool portion of the structure, which so far as its general character is concerned is similar to those now in use. Extending downwardly and forwardly from the top 6 of the stool member is the other member 7 of the stool, which as illustrated in the drawing has upper and lower openings 8 and 9, in which are journaled guide rollers 10 and 12, which are engaged by the strip of paper 13 as it passes from the supply roller 14 to the receiving roller 15. The supply roller is journaled in forward legs 16 of the structure, while the receiving roller is journaled in the legs 17 of the stool. The roller 14, as illustrated in the drawing (see Fig. 3) engages short sleeve bearings 18 and 19, the sleeve 19 being divided into two parts 20 and 21 Fig. 5, said parts being connected by a hinge 22 and detachably connected by a spring latch 23 mounted on the part 21 and engaging the upturned end 24 of the small plate 25 mounted on the part 20. By releasing the latch this bearing sleeve may be opened for the purpose of removing one supply roller after the paper has been unwound therefrom and substituting another in its place. This roller is operated by means of a spindle 26 directly journaled in one of the legs 16, its inner extremity being equipped with a disk 27 having a tongue 28 which engages a recess 29 of counterpart shape formed in the adjacent end of the roller. The outer extremity of the spindle 26 is equipped with a disk 2 which is milled or roughened as shown at 30 for ease of manipulation.

The part 20 of the bearing sleeve 19, as illustrated in the drawing, is formed integral with a plate 31 secured to the leg 16 by screws 32, or other suitable fastening devices. The sleeve 18 is also formed integral with the plate 33 secured to the other leg 18, by fastening devices 34.

The center portion of the roller 14 is cut away as shown at 35 to make room for a leaf spring 38, which is secured to the roller at one end as shown at 37, but its opposite end normally projects outwardly beyond the surface of the roller so that when a roll of paper is slipped thereon, the spring 36 is placed under sufficient tension to retain the roll of paper in place.

The receiving roller 15 is mounted and operated substantially in the same manner as the roller 14 (see Fig. 4) in which the numeral 38 designates a plate secured to one of the legs 17 by fastening devices 39, said plate carrying a short sleeve 40 to receive one end of the roller 15. The opposite end is mounted in a bearing 19 composed of parts 20 and 21, connected as illustrated in Fig. 5 and as heretofore described when speaking of the roller 14. The operating spindle 41 is also equipped with a disk 27 having a tongue 28 engaging a recess formed in the end of the roller for operating purposes. The opposite end of the spindle is formed polygonal in cross section as shown at 42 to receive an operating hand crank 43.

It will be understood that so far as the mechanism disclosed in Fig. 5 is concerned, with the exception of the crank 43, the mounting feature is common to both rollers 14 and 15. The roller 15 is also provided with a retaining spring 36, secured as shown at 37, and performs the same function as the similar spring 36 carried by the roller 14. The supply roll of paper 44 is provided with an inner sleeve 45, which directly engages the roller 15, the said sleeve being acted on by the retaining spring 36.

In starting the operation the paper should be first drawn from the supply roll up through the opening 9 into engagement with the roller 12, then upwardly lengthwise of the part 7 of the stool and then downwardly through the opening 8 where it engages the roller 10, and attached to a sleeve 45 mounted on the receiving roller 15 and held in place by the spring 36 the manner of connection may be by means of a little glue, or other suitable means. The device is then ready for use, and after each customer has used the stool, a new or fresh portion of the paper is drawn from the supply roll by the manipulation of the receiving roll through the agency of the hand crank 43.

The preferred form of the structure includes a paper strip equipped throughout its length with measuring chart portions 47, each of which has a graduated portion 48 extending longitudinally thereof (see Fig. 7) and numbered as illustrated in said Fig. 7, from 3½ to 13, to indicate sizes in length of shoes for different feet placed thereon. For instance, a foot of the length indicated between the heel line 49 or lowest part of the chart occupied by the foot, to the 3½ mark, would indicate that the person required a 3½ shoe. It should be noted that the numbers on the graduated portion 48 of the chart indicate the size length of the shoe for a foot of the length between the heel line and the marks opposite the numerals. The width of the shoe required by any foot is determined by the dotted lines designated "Child's A—A," "A," "B," "C," "D," "E" and "E—E," respectively. As illustrated in Fig. 7 of the drawing, the graduated portion 48 of the chart has sections respectively designated "Infants," "Children," "Misses and youths," "Women and men." Below the heel line on each chart portion 47 are arranged blanks respectively designated "Name," "Address," "Stock number," "Sub." and "Date." These are for the name and address of the customer, the stock number of the shoe sold him, the substitute designation of the shoe and the date of the sale. These may be referred to whenever the purchaser desires another shoe, either in person, or by mail, and will often times save a great deal of trouble to both the seller and the customer. The blank opposite the abbreviation "Sub." is filled with a designation to indicate the character of the shoe-last bought, thus making it practicable, as soon as the proper chart portion is referred to, to determine the exact style of shoe-last purchased, by any customer, where my improved device is employed. The inclined part 7 of the stool has a heel stop 50, which as illustrated in the drawing, consists of a piece of metal, one extremity of which is secured to the member 7 as shown in 51, after which it is bent upwardly as shown at 52, again bent and carried transversely across the lower part 7 of the member, as shown in 53, being again bent at 54 and carried transversely in the opposite direction, but finally bent as shown at 55, and carried upwardly in a straight portion 56, arranged to coöperate with the chart portions of the paper strip for the purposes of determining the width size required by the foot of any customer.

In using the device the foot of the customer is placed on the chart in such a position that the heel engages the stop device at the bottom, while one side of the foot engages the part 56. In this case if the opposite side or edge of the foot reaches the line designated "Child's A—A," the width of the shoe required will be determined by such designation, while the length will be determined by one of the marks and its corresponding numeral on the longitudinal graduated part 48.

Having thus described my invention, what I claim is:

1. A shoe stool provided with a foot portion and equipped with a strip of fabric upon and extending longitudinally of said foot portion, rollers suitably mounted on the stool and each connected with an end of said strip, and means for manipulating the rollers, whereby unused portions of the strip are successively brought into position for use on the foot portion of the stool.

2. A shoe stool provided with a foot portion and equipped with supply and receiving rollers, a roll of fabric mounted on the supply roller, the foot portion of the stool having transverse slots near its opposite extremities to receive the strip of fabric which is passed from the supply roll up through one of the slots in the foot portion of the stool, and thence down through the other slot, and connected with the receiving roll, and a manipulating crank also connected in operative relation with the last named roll.

3. A shoe stool provided with a foot portion and equipped with supply and receiving rollers removably mounted below the foot portion thereof, a roll of fabric mounted on the supply roller, the foot portion of the stool having upper and lower relatively narrow transversely arranged openings through which the fabric passes, a portion of the fabric lying lengthwise of the foot portion between said openings, one end of the fabric being secured to the receiving roller.

4. A shoe stool provided with a foot portion and having main rollers mounted below the foot portion thereof, the said rollers being removably mounted and equipped with operating spindles journaled in the stool and provided with manipulating devices, a roll of fabric mounted on one roller, the foot portion of the stool having upper and lower transversely arranged relatively narrow openings, through which the strip of fabric from the said roll is passed, leaving a portion of the strip upon the foot part of the stool between the two openings, the latter being equipped with guide rollers, the strip of fabric being connected with the other main roller.

5. A shoe stool provided with a foot portion and equipped with manipulating rollers, one of which is provided with a roll of fabric, the foot portion of the stool having transversely arranged relatively narrow openings near the top and bottom, through which the strip of fabric from the roll is passed, the free end of the fabric being connected with the other roller for manipulating purposes, the strip of fabric being arranged to have an exposed portion on the foot portion of the stool between the openings, the foot portion of the stool being also provided with a heel stop formed on its lower portion and a guide extending longitudinally of the foot portion and parallel with the strip of fabric, the latter consisting of a series of portions carrying indicia indicating shoe sizes for varying foot measurements.

6. A shoe stool provided with a foot portion and equipped with manipulating rollers, on one of which is mounted a roll of fabric, composed of a series of portions, each of which is equipped with indicia indicating shoe sizes in width and length, the foot portion of the stool having openings to permit the passage of the strip of fabric from one roller to the other, the length of the foot portion of the stool between the openings being sufficient to expose one of said portions of the strip of fabric, the foot portion of the stool also having heel and side stops arranged with reference to the indicia on the said portions of the fabric strip, substantially as described.

7. A shoe stool provided with a foot portion and equipped with rollers, one of which carries a roll of fabric composed of a series of measurement portions, each having indicia referring to shoe sizes in terms of width and length, and also containing indicia and blanks for registering the name, address and other data, referring to individual purchasers, the stool being also provided with heel and side stops arranged with special reference to the indicia of the measurement portions of the strip, the said strip of fabric being also connected with the other roller for manipulating purposes.

8. A shoe stool provided with a foot portion and equipped with heel and side stops, a roll of fabric adapted to engage its foot portion and composed of a series of measurement portions carrying indicia of shoe sizes in terms of width and length and means for manipulating the said strip of fabric to successively bring its measurement portions into coöperative relation with the heel and side stops, substantially as described.

9. A shoe stool provided with a foot portion and equipped with rollers suitably journaled therein, sleeves mounted on the said rollers and spring-held thereon to rotate therewith, a strip of fabric whose extremities are respectively connected with the two sleeves, the foot portion of the stool having openings to receive the fabric and suitably spaced to make room for the desired length of fabric between the openings, the fabric being passed from one roller through one opening, thence longitudinally of the foot portion of the stool to the other opening, thence through the latter to the other roller, and means for winding said fabric from one roller to the other, substantially as described.

10. A shoe stool provided with a foot portion and equipped with rollers suitably journaled therein, sleeves mounted on the said rollers and spring-held thereon to rotate therewith, a strip of fabric whose extremities are respectively connected with the two sleeves, the foot portion of the stool having openings to receive the fabric and suitably spaced to make room for the desired length of fabric through one opening, thence longitudinally of the foot portion of the stool to the other opening, thence through the latter to the other roller, the said strip of fabric including a series of measurement portions carrying indicia of the shoe sizes in terms of width and length, the said measurement portions being adapted to be successively exposed on the foot portion of the shoe stool by the openings, as the strip of fabric is manipulated by the rollers.

11. A shoe stool provided with a foot portion and equipped with rollers suitably journaled therein, sleeves mounted on the said rollers and spring-held thereon to rotate therewith, a strip of fabric whose extremities are respectively connected with the two sleeves, the foot portion of the stool having openings to receive the fabric and suitably spaced to make room for the desired length of fabric through one opening, thence longitudinally of the foot portion of the stool to the other opening, thence through the latter to the other roller, the said strip of fabric including a series of measurement portions carrying indicia of the shoe sizes in terms of width and length, the said measurement portions being adapted to be successively exposed on the foot portion of the shoe stool by the openings, as the strip of fabric is manipulated by the rollers, the foot portion of the stool being provided with heel and side stops arranged to coöperate with the indicia on the measurement portions of a strip of fabric substantially as described.

12. A shoe stool provided with a foot portion which is transversely slotted at the top and bottom, rollers arranged below the foot portion and having sleeves spring-retained thereon to rotate therewith, the said strip of fabric being passed upwardly from one roller through one slot, thence lengthwise of the foot portion of the stool to and down through the other slot to the other roller, and suitable means for manipulating the rollers whereby unused portions of the strip of fabric may be successively exposed on the foot portions of the stool, the last named part of the stool being equipped with heel and side stops and the strip of fabric including a series of measurement portions carrying indicia of shoe measurements, arranged with special reference to the heel and side stops.

13. A shoe stool provided with a foot portion and equipped with a strip of fabric extending longitudinally of said portion, and means suitably mounted on the stool and connected with the ends of said strip for manipulating the latter, whereby unused portions of the strip are successively brought into position for use on the foot portion of the stool.

In testimony whereof I affix my signature in presence of two witnesses.

ORION W. NUNN.

Witnesses:
A. J. O'BRIEN,
A. EBERT O'BRIEN.